(12) United States Patent
Sugimoto et al.

(10) Patent No.: US 9,732,971 B2
(45) Date of Patent: Aug. 15, 2017

(54) AIR-CONDITIONING DEVICE AND METHOD FOR CONTROLLING AIR-CONDITIONING DEVICE

(75) Inventors: Shintaro Sugimoto, Moriguchi (JP); Norioki Fujimoto, Moriguchi (JP); Nobuhiro Idei, Moriguchi (JP); Jun Yamauchi, Moriguchi (JP); Seiichi Koga, Moriguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 639 days.

(21) Appl. No.: 14/342,280

(22) PCT Filed: Aug. 22, 2012

(86) PCT No.: PCT/JP2012/071178
§ 371 (c)(1),
(2), (4) Date: Feb. 28, 2014

(87) PCT Pub. No.: WO2013/031597
PCT Pub. Date: Mar. 7, 2013

(65) Prior Publication Data
US 2014/0213171 A1  Jul. 31, 2014

(30) Foreign Application Priority Data

Aug. 31, 2011 (JP) .................................. 2011-189590
Sep. 30, 2011 (JP) .................................. 2011-216266
Sep. 30, 2011 (JP) .................................. 2011-216267

(51) Int. Cl.
*F24F 7/00* (2006.01)
*F24F 7/007* (2006.01)
(Continued)

(52) U.S. Cl.
CPC .......... *F24F 7/007* (2013.01); *F24F 11/0079* (2013.01); *F24F 7/06* (2013.01); *Y02B 30/746* (2013.01)

(58) Field of Classification Search
CPC ....................................... F24F 11/00
(Continued)

(56) References Cited

U.S. PATENT DOCUMENTS 5,102,040 A * 4/1992 Harvey ................ F24F 11/0001
165/289
5,540,619 A * 7/1996 Ahmed .................... F24F 11/04
454/256

(Continued)

FOREIGN PATENT DOCUMENTS

CN 101173775 A 5/2008
JP 61-180851 A 8/1986
(Continued)

OTHER PUBLICATIONS

European Communication dated May 12, 2015 issued in European Patent Application No. 12829016.0.
(Continued)

*Primary Examiner* — Avinash Savani
*Assistant Examiner* — Vivek Shirsat
(74) *Attorney, Agent, or Firm* — McDermott Will & Emery LLP

(57) ABSTRACT

There are provided an air-conditioning device that can easily perform fan setting to obtain a proper air volume in accordance with external static pressure, and a method of controlling the air-conditioning device. There is executed air volume setting processing (S3 to S14) for measuring an actual rotation number (r_MAX) when a fan motor for driving an air blowing fan is set to a maximum output, and setting the rotation number corresponding to a target air (Continued)

volume of the air blowing fan under normal operation of the built-in type air-conditioning device.

18 Claims, 10 Drawing Sheets

(51) Int. Cl.
 *F24F 11/00* (2006.01)
 *F24F 7/06* (2006.01)

(58) Field of Classification Search
 USPC .......................................... 454/256, 338, 239
 See application file for complete search history.

(56) References Cited

U.S. PATENT DOCUMENTS

| | | | | |
|---|---|---|---|---|
| 2008/0199159 | A1* | 8/2008 | Lee | G06F 1/20 388/815 |
| 2010/0226792 | A1* | 9/2010 | Sato | F04D 25/166 417/1 |
| 2010/0256821 | A1* | 10/2010 | Jeung | F24F 11/047 700/276 |

FOREIGN PATENT DOCUMENTS

| | | |
|---|---|---|
| JP | 04-126949 A | 4/1992 |
| JP | 3103583 B2 | 10/2000 |
| JP | 2001-082785 A | 3/2001 |
| JP | 2003-302093 A | 10/2003 |
| JP | 2003302093 A | 10/2003 |
| JP | 2004-085150 A | 3/2004 |
| JP | 2004085150 A | 3/2004 |
| JP | 2005-300089 A | 10/2005 |
| JP | 2005300089 A | 10/2005 |
| JP | 2010031680 A | 2/2010 |

OTHER PUBLICATIONS

Chinese Office Action and Search Report dated Dec. 17, 2015 issued in Chinese Patent Application No. 2012800414665 (English translation).

International Search Report dated Nov. 27, 2012 issued in Application No. PCT/JP2012/071178.

International Preliminary Report on Patentability and Written Opinion of the International Searching Authority for PCT/JP2012/071178 dated Mar. 13, 2014 with English translation.

Chinese Office Action dated Jul. 18, 2016 issued in Chinese Patent Application No. 201280041466.5 (English translation)

* cited by examiner

FIG.6

| CONDITION | AIR VOLUME SETTING MODE VALUE |
|---|---|
| P10 UPPER LIMIT ROTATION NUMBER $\leq$ r_MAX | 10 |
| P9 UPPER LIMIT ROTATION NUMBER $\leq$ r_MAX<P10 UPPER LIMIT ROTATION NUMBER | 9 |
| P8 UPPER LIMIT ROTATION NUMBER $\leq$ r_MAX<P9 UPPER LIMIT ROTATION NUMBER | 8 |
| P7 UPPER LIMIT ROTATION NUMBER $\leq$ r_MAX<P8 UPPER LIMIT ROTATION NUMBER | 7 |
| P6 UPPER LIMIT ROTATION NUMBER $\leq$ r_MAX<P7 UPPER LIMIT ROTATION NUMBER | 6 |
| P5 UPPER LIMIT ROTATION NUMBER $\leq$ r_MAX<P6 UPPER LIMIT ROTATION NUMBER | 5 |
| P4 UPPER LIMIT ROTATION NUMBER $\leq$ r_MAX<P5 UPPER LIMIT ROTATION NUMBER | 4 |
| P3 UPPER LIMIT ROTATION NUMBER $\leq$ r_MAX<P4 UPPER LIMIT ROTATION NUMBER | 3 |
| P2 UPPER LIMIT ROTATION NUMBER $\leq$ r_MAX<P3 UPPER LIMIT ROTATION NUMBER | 2 |
| P1 UPPER LIMIT ROTATION NUMBER $\leq$ r_MAX<P2 UPPER LIMIT ROTATION NUMBER | 1 |
| r_MAX<P1 UPPER LIMIT ROTATION NUMBER | 1 |

AIR-CONDITIONING DEVICE AND METHOD FOR CONTROLLING AIR-CONDITIONING DEVICE

CROSS-REFERENCE TO RELATED APPLICATIONS

The present application is the U.S. National Phase of PCT/JP2012/071178 dated Aug. 22, 2012 which claims priority from Japanese Patent Application No. 2011-189590 filed Aug. 31, 2011, Japanese Patent Application No. 2011-216266 filed Sep. 30, 2011, Japanese Patent Application No. 2011-216267 filed Sep. 30, 2011 the subject matter of each is incorporated herein by reference in entirety.

TECHNICAL FIELD

The present invention relates to an air-conditioning device that has an indoor unit for accommodating an air blowing fan therein and blows out air from the air blowing fan, and a method of controlling the air-conditioning device.

BACKGROUND ART

Some type of air-conditioning device has an indoor unit for accommodating an air blowing fan therein and a blow-out duct or a suction duct which is connected to the indoor unit, and blows out air from the air blowing fan. With respect to this type of air-conditioning device, there are various installation states among which the length of the blow-out duct or the suction duct is different, or under which an air suction grill facing a room space and an air blow-out grill are connected to each other through a duct or directly connected to each other through no duct. External static pressure (static pressure usable out of the machine) is varied in accordance with the installation state.

When the external static pressure varies, the relationship between the rotation number of the air blowing fan and the air volume (air volume characteristic) varies, so that it is required to change the rotation number of the air blowing fan in accordance with the variation of the air volume characteristic in order to obtain a proper air volume. In order to perform fan control to obtain a proper air volume, there has been proposed an air-conditioning device which controls the air blowing fan so as to obtain a perception air volume larger than an air volume used under normal operation, measures the shaft power of the air blowing fan under this control to obtain a characteristic of shaft power and air volume, and controls the fan on the basis of the thus-obtained characteristic (see Patent document 1, for example).

PRIOR ART DOCUMENT

Patent Document

Patent Document 1: Japanese Unexamined Patent Application Publication No. 2010-31680

SUMMARY OF THE INVENTION

Problem to be Solved by the Invention

However, the conventional air-conditioning device has been required to measure both of the air volume and the shaft power of the air blowing fan, so that the measurement is cumbersome and needs much time.

The present invention has been implemented in view of the foregoing situation, and has an object to provide an air-conditioning device in which fan setting for achieving a proper air volume in accordance with external static pressure can be easily performed, and a method of controlling the air-conditioning device.

Means of Solving the Problem

In order to attain the above object, according to the present invention, an air-conditioning device that is provided with an indoor unit having an air blowing fan accommodated therein and blows out air from the air blowing fan is characterized by comprising: an air volume controller that switches a rotation number of the air blowing fan under normal operation of the air-conditioning device so that the air blowing fan is controlled to a predetermined air volume; and a setting unit that executes air volume setting processing for measuring an actual rotation number when a fan motor for driving the air blowing fan is set to a maximum output and setting the rotation number corresponding to the air volume on the basis of the measured actual rotation number.

In the above construction, the setting unit may detect the rotation number of the motor for driving the air blowing fan on the basis of a pulse output of the motor, and set the rotation number corresponding to the air volume on the basis of the detected rotation number. Furthermore, the motor for driving the air blowing fan may be provided with a rotation number detection device, and the setting unit may set the rotation number corresponding to the air volume on the basis of a rotation number detected by the rotation number detection device. Furthermore, in the above construction, the setting unit may set the rotation number corresponding to the air volume on the basis of an actual rotation number when driving power of the air blowing fan reaches a predetermined upper limit. In this case, the air blowing fan may be subjected to motor control by a pulse width modulation system or a pulse amplitude modulation system, and the setting unit may set the rotation number corresponding to the air volume on the basis of an actual rotation number when pulse width or pulse amplitude reaches a predetermined limit.

In the above construction, the setting unit may execute the air volume setting processing when the air-conditioning device is under test operation. Furthermore, in the above construction, the setting unit may determine whether the air-conditioning device is configured as a duct type or not, and execute the air volume setting processing in case of the duct type.

Furthermore, the above construction may be further provided with an under-change operation controller that executes a test operation for increasing the rotation number of the air blowing fan from the set rotation number by only a predetermined rotation number after the set rotation number of the air blowing fan is changed, and an under-change setting changing unit that decreases the set rotation number when the fan motor for driving the air blowing fan falls into an overload state in the test operation.

In the above construction, when the under-change setting changing unit decreases the set rotation number, the under-change operation controller may execute a test operation of increasing the rotation number of the air blowing fan from the set rotation number after the change by only a predetermined rotation number, and the under-change setting changing unit may further decrease the set rotation number when the fan motor falls into an overload state in the test operation. Furthermore, in the above construction, it may be determined that the fan motor falls into the overload state when motor current of the air blowing fan reaches a predetermined current limit value.

Furthermore, in the above construction, an automatic function for automatically setting the set rotation number of the air blowing fan and a manual function for manually setting the set rotation number of the air blowing fan may be provided, the test operation may be executed when the set rotation number is changed by manual setting, and the set rotation number may be decreased when the fan motor falls into an overload state in the test operation.

Still furthermore, the above construction may be further provided with an under-normal-operation operation controller that executes an increasing operation of increasing the rotation number of the air blowing fan from the set rotation number by only a predetermined rotation number at a time interval during operation of the air blowing fan, and an under-normal-operation setting changing unit that decreases the set rotation number when the rotation number of the air blowing fan does not increase in spite of the increasing operation.

In the above construction, when the rotation number of the air blowing fan does not increase in spite of the increasing operation after the under-normal-operation setting changing unit decreases the set rotation number, at least one of emission of an alarm and stop of the operation may be performed. Furthermore, the above construction may be further provided with a protection circuit that limits the motor current of the air blowing fan to a predetermined current limit value or less when the motor current of the air blowing fan reaches the predetermined current limit value.

In the above construction, the increasing operation may be executed when a predetermined condition under which a motor temperature of the air blowing fan is estimated to be high is satisfied. In this case, the predetermined condition may contain at least one of a condition that the suction temperature of the air blowing fan is not less than a predetermined temperature, a condition that an operation time is not less than a predetermined time and a condition that the air volume of the air blowing fan is not less than a predetermined air volume. Furthermore, in the above construction, at least one of a blow-out duct and a suction duct may be connected to the indoor unit.

According to the present invention, a method of controlling an air-conditioning device having an indoor unit in which an air blowing fan is accommodated and to which at least one of a blow-out duct and a suction duct is connected, blow-out air being blown out by the air blowing fan, is characterized by comprising: executing air flow setting processing of measuring an actual rotation number when a fan motor for driving the air blowing fan is set to a maximum output, and setting a rotation number corresponding to an air volume of the air blowing fan under normal operation of the air-conditioning device on the basis of the measured actual rotation number.

In the above construction, there may be executed a step of executing a check operation of increasing the rotation number of the air blowing fan from set rotation number by only a predetermined rotation number after the set rotation number of the air blowing fan is changed, and a step of decreasing the set rotation number when a fan motor for driving the air blowing fan falls into an overload state in the check operation.

Furthermore, in the above construction, there may be executed a step of executing an increasing operation of increasing the rotation number of the air blowing fan from the set rotation number by only a predetermined rotation number at a time interval during operation of the air blowing fan, and a step of decreasing the set rotation number when the rotation number of the air blowing fan does not increase in spite of the increasing operation.

Furthermore, the present invention is applied to the air-conditioning device and the control method therefor, and further the present invention may be executed by a mode of delivering a control program for executing the present invention through an electrical communication circuit or a mode of storing the program into a computer-readable recording medium such as a magnetic recording medium, an optical recording medium, a semiconductor recording medium or the like and distributing the recording medium.

Effect of the Invention

According to the present invention, there is executed the air volume setting processing of measuring the actual rotation number when the fan motor for driving the air blowing fan is set to the maximum output and setting the rotation number corresponding to the air volume on the basis of the measured actual rotation number. Therefore, fan setting for obtaining a proper air volume in accordance with external static pressure can be easily performed.

BRIEF DESCRIPTION OF THE DRAWINGS

FIG. 6 is a diagram showing a determination table.

MODE FOR CARRYING OUT THE INVENTION

An embodiment according to the present invention will be described hereunder with reference to the drawings.

Figure 1:
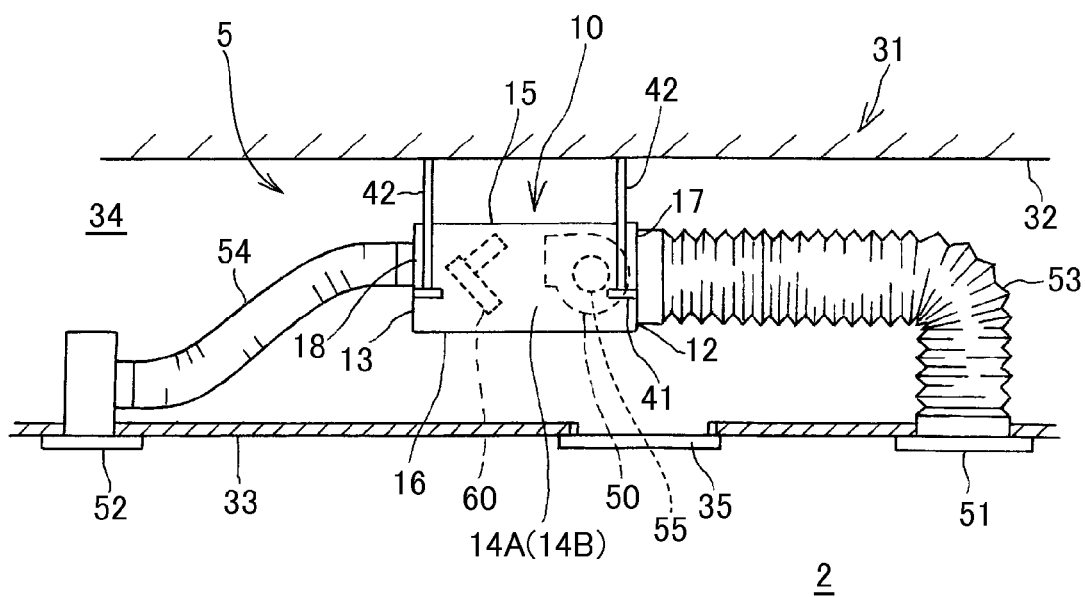
FIG. 1 is a side view showing a built-in type air-conditioning device according to an embodiment of the present invention.

FIG. 1 is a side view showing a built-in type air-conditioning device according to an embodiment of the present invention.

The built-in type air-conditioning device 1 has an indoor unit 5 which is connected to an outdoor unit (not shown) disposed outdoors through a refrigerant pipe to constitute a refrigeration cycle circuit, and makes refrigerant flow in the refrigeration cycle to heat-exchange outdoor air with air in an air-conditioning target room 2 (indoor air) which is circulated in the indoor unit 5, thereby air-conditioning the inside of the room.

The indoor unit 5 has a unit main body 10 which is supported through suspending bolts 42 in a ceiling space 34 between a ceiling 32 and a ceiling plate 33 of a building 31, a suction duct 53 connected to a suction port 17 of the unit main body 10, and a blow-out duct 54 connected to a blow-out port 18 of the unit main body 10. An air blowing fan 50 and an indoor heat exchanger 60 are disposed in the unit main body 10.

The unit main body 10 is formed in a substantially rectangular box-like shape and comprises a back plate 12, a front plate 13, right and left side plates 14A and 14B, a top plate 15 and a bottom plate 16. The suction port 17 is formed in the back plate 12, and the blow-out port 18 is formed in the front plate 13. The suction duct 53 extends rearwards from the suction port 17 of the unit main body 10, and is connected to an air intake port 51 provided at a ceiling position which is far away from the unit main body 10. The blow-out duct 54 extends forwards from the blow-out port 18 of the unit main body 10, and is connected to an air supply port 52 provided at a ceiling position which is far away from the unit main body 10. An air passage bridging the suction port 17 and the blow-out port 18 is secured in the unit main body 10, and the air blowing fan 50 and the indoor heat exchanger 60 are successively disposed in this order from the upstream side (the suction port 17 side) in this air passage.

The air blowing fan 50 is a sirocco fan as a centrifugal blowing fan, and it is rotated by a fan motor 55.

The indoor heat exchanger 60 is a fin tube type heat exchanger. Air blown out from the air blowing fan 50 is passed through the heat exchanger 60 to thereby heat-exchange refrigerant and air in the heat exchanger 60 with each other, so that the air can be cooled or heated.

In the indoor unit 5, the air blowing fan 50 is driven, whereby air in the air-conditioning target room 2 is sucked through the air intake port 51, the suction duct 53 and the suction port 17 into the unit main body 10, the sucked air is blown to the indoor heat exchanger 60 and heat-exchanged with the refrigerant flowing in the indoor heat exchanger 60, and air-conditioning air is supplied through the blow-out port 18, the blow-out duct 54 and the air supply port 52 into the air-conditioning target room 2. In this embodiment, cooling operation/heating operation for cooling/heating the air-conditioning target room 2 can be performed by performing the refrigerating cycle operation and the operation of the air blowing fan 50. Furthermore, air blowing operation for circulating indoor air can be performed by performing the operation of the air blowing fan 50 under the state that the refrigerating cycle operation is stopped.

Figure 2:
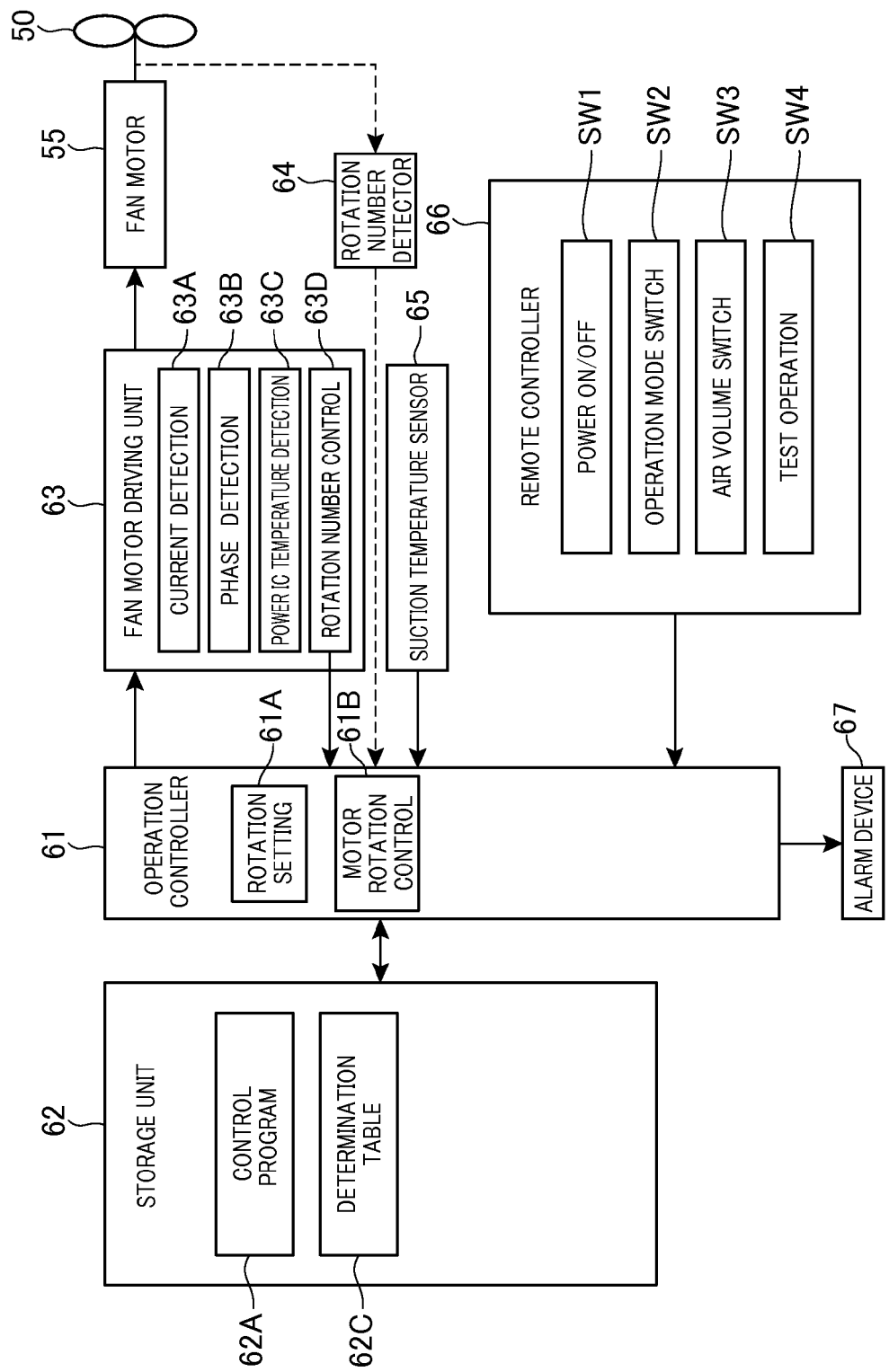
FIG. 2 is a diagram showing an air blowing fan control system of the built-in type air-conditioning device.

FIG. 2 shows an air blowing fan control system of the built-in type air-conditioning device 1.

In FIG. 2, an operation controller 61 concentrically controls the respective parts of the built-in type air-conditioning device 1 by executing a control program 62A stored in a storage unit 62, and has a rotation setting unit 61A for setting the rotation of the air blowing fan 50, a motor rotation controller 61B for controlling the rotation of the fan motor 55, etc. The operation controller 61 detects the motor rotation number (=fan rotation number) on the basis of a pulse output from the fan motor 5.

The fan motor 55 is a DC brushless motor, and a fan motor driving unit 63 drives the fan motor 55 through a pulse width modulation (PWM) type inverter and power IC under the control of the operation controller 61. The fan motor driving unit 63 has a current detector 63A for detecting motor current, a phase detector 63B for detecting the phase of a PWM driving signal, a temperature detector 63C for detecting the temperature of the power IC, a rotation number controller 63D for controlling the rotation number of the fan motor 55, etc.

The current detector 63A monitors and limits the motor current so that the instantaneous value of the motor current does not exceed a predetermined upper limit, and the phase detector 63B monitors and limits the PWM driving signal so that the phase of the PWM driving signal does not exceed the limit value corresponding to the upper limit of the motor current. That is, the current detector 63A and the phase detector 63B function as a protection circuit (overpower protection circuit) for keeping the driving power of the fan motor 55 to a predetermined upper limit when the driving power of the fan motor 55 is about to exceed the upper limit.

In this case, the current detector 63A functions as a first overcurrent protection circuit for monitoring and limiting the motor current so that the instantaneous value of the motor current does not exceed a current limit value LM as a predetermined upper limit, and when the motor current is about to exceed the current limit value LM, the current detector 63A keeps the motor current to the current limit value LM. Furthermore, the phase detector 63B functions as a second overcurrent protection circuit for monitoring and limiting the phase of the PWM driving signal (motor driving signal) so that the phase of the PWM driving signal does not exceed the limit value corresponding to the upper limit of the motor current. When the phase is about to exceed the limit value, the phase detector 63B keeps the phase to the limit value.

Furthermore, the temperature detector 63C functions as a protection circuit (overheat protection circuit) for suppressing the output of the motor when the temperature TS of the power IC exceeds a predetermined upper limit (upper limit temperature).

Figure 3:
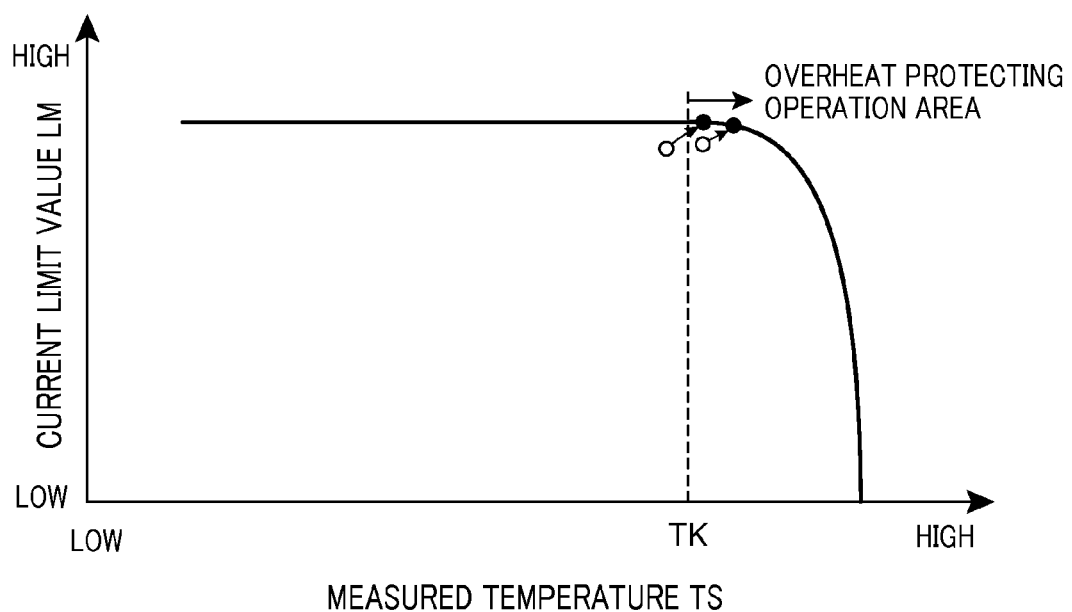
FIG. 3 is a diagram showing the relationship between a current limiting value used for protection of overcurrent and measurement temperature.

FIG. 3 shows the relationship between the current limit value LM used for overcurrent protection and the measurement temperature TS. As shown in FIG. 3, the current limit value LM is set to a value which is substantially constant until the temperature of the power IC reaches a certain temperature TK, but is not constant from the viewpoint of overheat protection and varies to a small value when the temperature of the power IC is equal to or higher than the certain temperature TK. In an "overheat protection operation area" as an area in which the temperature of the power IC is equal to or higher than this temperature TK, some deviation occurs from the actual line and thus an error is relatively large.

As shown in FIG. 2, a suction temperature sensor 65 for measuring suction temperature T1 of the air blowing fan 50 is connected to the operation controller 61, and the operation controller 61 is configured to be capable of monitoring the suction temperature T1.

A remote controller 66 for remotely operating the built-in type air-conditioning device 1 is further connected to the operation controller 61 so as to be capable to communicating with the operation controller 61. The remote controller 66 is configured so that a general user or a worker can operate the built-in type air-conditioning device 1 by operating the remote controller 66.

As shown in FIG. 2, the remote controller 66 is provided with a power ON/OFF switch SW1 for instructing ON/OFF of a power source, an operation mode changing switch SW2 for switching the operation mode (cooling operation/heating operation/air blowing operation), an air volume changing switch SW3 for switching the airvolume to Weak (Low: L)/Strong (High: H)/Quick (HH: Hasty High), a test operation switch SW4 for instructing start/stop of test operation, etc., and the operations corresponding to the respective switches SW1 to SW4 can be performed.

Here, the test operation switch SW4 is a switch which is operated by a worker who performs an installation work of the built-in type air-conditioning device 1 and the maintenance work, and the other switches are switches which are arbitrarily operated by the worker and general users.

Furthermore, the built-in type air-conditioning device 1 has an alarm device 67 for performing some kinds of alarms by sound emitting processing, display processing or the like under the control of the operation controller 61.

The fan motor 55 is a motor which can be controlled to be variable in rotation number, and the operation controller 61 gives a rotation number instruction to the fan motor 55 so as to variably control the rotation number r of the fan.

There are various installation states for the built-in type air-conditioning device 1, for example, the lengths of the ducts 53, 54 are varied, one of the ducts 53, 94 is omitted, etc. Therefore, the external static pressure varies in accordance with the installation state.

When the external static pressure varies, the relationship between the rotation number of the air blowing fan 50 and the air volume (the air volume characteristic) varies. Therefore, even when the fan motor 55 is rotated at the same rotation number, the air volume varies and thus a target air volume (the air volume corresponding to each of Weak (L)/Strong (H)/Quick (HH) cannot be obtained.

Therefore, this embodiment is provided with an automatic function of performing air volume setting processing for automatically setting the fan rotation number corresponding to the target air volume in accordance with the external static pressure, and also provided with a manual function of manually setting the fan rotation number (set rotation number) in accordance with any user's taste.

<Automatic Setting of Fan Rotation Number>

First, the automatic function will be described.

The inventors of this application have paid much attention to the fact that when the fan motor 55 is instructed to operate at the maximum output, the actual rotation number (=the actual rotation number of the air blowing fan 50) r Max varies in accordance with the external static pressure. The content of the automatic function resides in that the actual rotation number r_MAX is obtained under the state that the built-in type air-conditioning device 1 is installed, and the air volume setting processing of setting the fan rotation number corresponding to a target air volume on the basis of the value of the actual rotation number r_MAX is performed.

A determination table 62C for determining an air volume setting mode value is stored as information used for the air volume setting processing in the storage unit 62.

Figure 4:
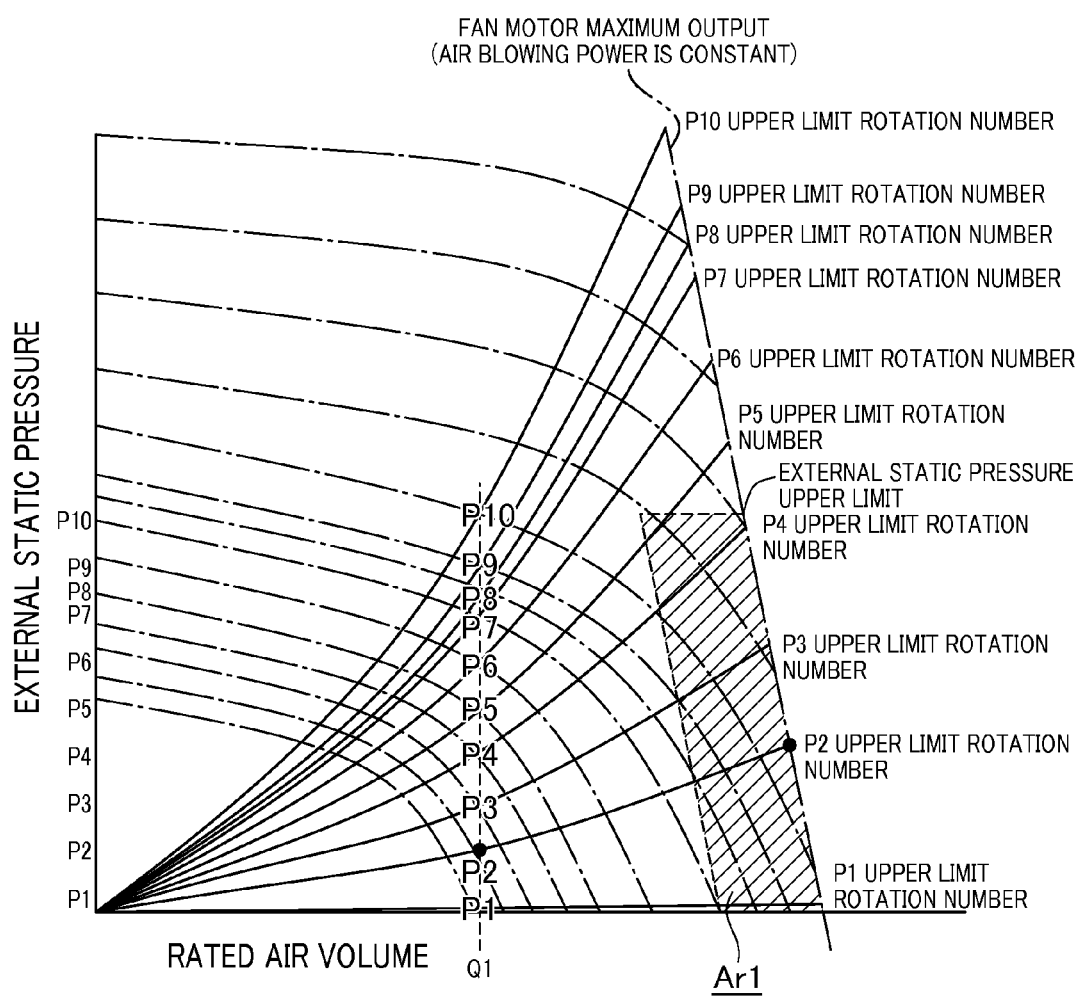
FIG. 4 is a characteristic curve diagram showing the relationship between external static pressure and air volume.

FIG. 4 shows a characteristic curve diagram (PQ characteristic) showing the relationship between the external static pressure and the air volume. In this figure, a one-dotted chain line represents a line on which the fan rotation number r is constant, a solid line represents a resistance curve, and a two-dotted chain line represents the maximum output of the fan motor (air flowing power is constant).

According to this embodiment, the fan rotation number r at which a rated air volume (target air volume) is generated is checked every external static pressure (P1 to P10) in advance, and this value finally becomes a fan rotation number r which is determined in accordance with the external static pressure concerned. The output of the fan motor is increased up to the maximum fan rotation number r under the pressure loss state, and the upper limit value of the fan rotation number r (r_MAX), that is, P1 upper limit rotation number to P10 upper limit rotation number which correspond to the fan rotation number (rMAX) when the fan motor 55 has the maximum output are measured in advance.

Figure 5:
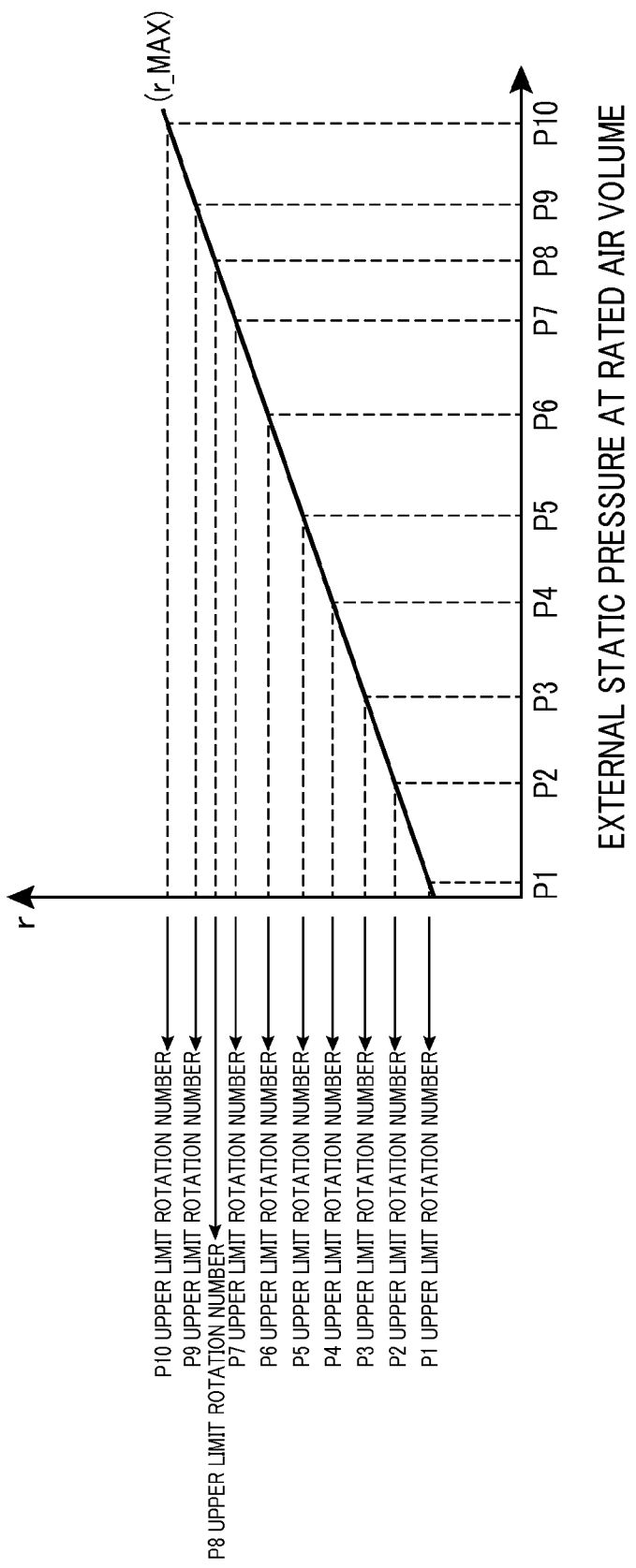
FIG. 5 is a characteristic curve diagram showing the external static pressure and the upper limit value of the fan rotation number.

FIG. 5 shows a thus-obtained measurement result. FIG. 5 is a characteristic curve diagram showing the relationship between the external static pressure and the upper limit value of the fan rotation number r, and the abscissa axis represents the external static pressure, and the ordinate axis represents the fan rotation number r.

FIG. 6 shows a determination table 62C for determining the air volume setting mode value from the upper limit value r_MAX of the actual rotation number of the air blowing fan 50. In the following description, the upper limit value r_MAX of the actual rotation number is represented as an actual rotation number upper limit value r_MAX.

As shown in FIG. 6, in the determination table 62C, when the actual rotation number upper limit value r_MAX is less than the P2 upper limit rotation number, the air volume setting mode value is set to value 1. When the actual rotation number upper limit value r_MAX is not less than the P2 upper limit rotation number and is also less than the P3 upper limit rotation number, the air volume setting mode value is set to value 2. When the actual rotation number upper limit value r_MAX is not less than the P3 upper limit rotation number and also is less than the P4 upper limit rotation number, the air volume setting mode value is set to value 3. When the actual rotation number upper limit value r_MAX is not less than the P4 upper limit rotation number and also is less than the P5 upper limit rotation number, the air volume setting mode value is set to value 4. When the actual rotation number upper limit value r_MAX is not less than the P9 upper limit rotation number and is also less than the P10 upper limit rotation number, the air volume setting mode value is set to value 9. When the actual rotation number upper limit value r_MAX is not less than the P10 upper limit rotation number, the air volume setting mode value is set to value 10.

In this embodiment, in the case where the air volume setting mode value is set to the value 1, the fan rotation number is set so that a sufficient set air volume (target air volume) is secured when the external static pressure is equal to the value P1. When the external static pressure is less than the value P2, the fan rotation number can be set so that a set air volume (target air volume) is secured. In the case where the air volume setting mode value is equal to the value 2, the fan rotation number is set so that a set air volume (target air volume) is secured when the external static pressure is less than the value P3. In the case where the air volume setting mode value is equal to the value 3, the fan rotation number is set so that a set air volume (target air volume) is secured when the external static pressure is less than the value P4. In the case where the air volume setting mode value is equal to the value 9, the fan rotation number is set so that a set air volume (target air volume) is secured when the external static pressure is less than the value P10. In the case where the air volume setting mode value is equal to the value 10, the fan rotation number is set so that a set air volume (target air volume) is sufficiently secured when the external static pressure is equal to the value P10. As described above, a rotation number at which a proper air volume can be secured can be selected in conformity with the external static pressure on the basis of the air volume setting mode value.

Figure 7:
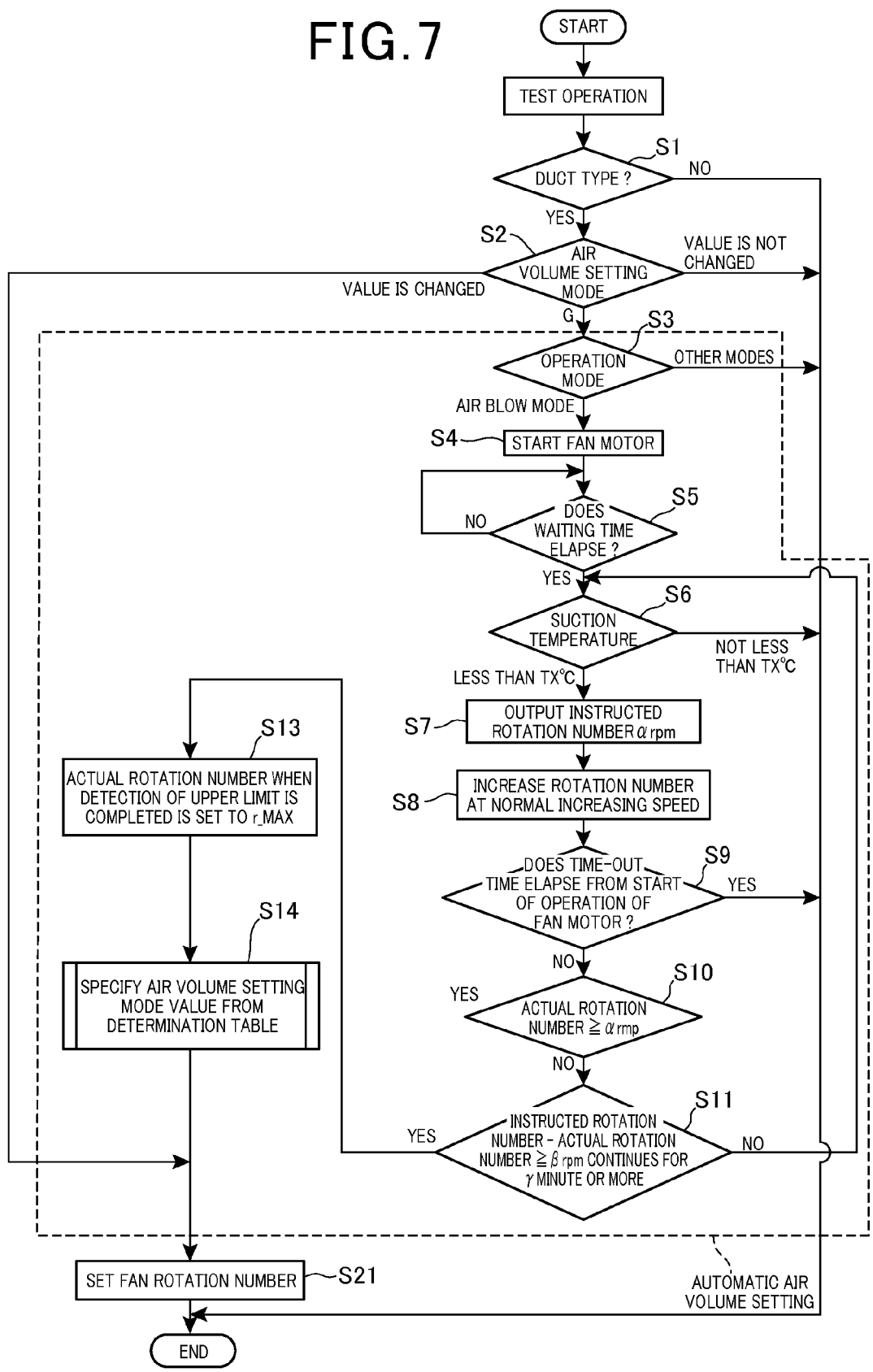
FIG. 7 is a flowchart showing air volume setting processing.

FIG. 7 is a flowchart showing the air volume setting processing.

This air volume setting processing is performed after the built-in type air-conditioning device 1 is installed and when test operation to be executed before the normal operation is executed. That is, when the built-in type air-conditioning device 1 is installed and then the test operation switch SW4 provided to the remote controller 66 is operated by an installation worker, the operation controller 61 starts the air volume setting processing.

When this flow is executed, the operation controller 61 first determines whether the air-conditioning device 1 is configured as a duct type having a duct (step S1). If it has a duct (step S1: YES), the processing goes to the processing of step S2. On the other hand, if it is not configured as a duct type, the processing concerned is finished.

In step S2, the operation controller 61 determines on the basis of a preset air volume setting mode value whether the automatic air volume setting is executed or the manual air volume setting is executed. In this case, when the air volume setting mode value is a value G which instructs the automatic air volume setting, the processing goes to the processing of step S3 to start the automatic air volume setting. If the air volume setting mode value is changed to another value (other than the value G), the processing goes to fan rotation number setting of step S21 for performing the manual air volume setting.

The air volume setting mode value and the operation mode (cooling/heating/air blow) under test operation are set by the installation worker before the test operation is executed. In this embodiment, the air-conditioning device is configured so that the automatic air volume setting is started when the air volume setting mode value has been set to the value G and the operation mode has been set to "air blow", and also under the other settings, the manual air volume setting may be executed or the operation mode of the test operation may be selected by setting the may be selected.

When the manual air volume setting is executed, the operation controller 61 goes from step S2 to step S21 to perform the control (fan rotation number switching control) of setting the fan rotation number corresponding to the preset air volume setting mode value and switching the fan rotation number according to this setting under normal operation (an operation other than the test operation) of the built-in type air-conditioning device 1.

On the other hand, when the air volume setting mode value is not changed from a value which is other than the value G and also has been already set, the fan rotation number has been already set and thus the air volume setting processing is immediately finished.

When the automatic air volume setting is executed, the operation controller 61 goes from step S2 to step S3 to determine the operation mode. When the operation mode is "air blow", the operation controller 61 goes to the processing of step S4 to continue the automatic air volume setting. On the other hand, in the case of an operation mode other than "air blow", that is, in the case of "cooling" or "heating", a proper automatic air volume setting procedure is not taken, and thus the air volume setting processing is finished without executing the automatic air volume setting.

When the processing goes to step S4, the operation controller 61 waits for lapse of a predetermined standby time (one minute in this embodiment) after starting the fan motor 55 through the fan motor driving unit 63 (step S5), and then determines whether the suction temperature T1 detected by the suction temperature sensor 65 is within a motor usable range (less than TX° C. in this embodiment) or not (step S6). The operation controller 61 determines the suction temperature T1 after waiting for lapse of the standby time, and thus it can be accurately determined on the basis of the accurate temperature of the air sucked from the air-conditioning target room 2 whether the suction temperature T1 is within the motor usable range (less than TX° C. in this embodiment) or not.

The operation controller 61 goes to the processing of step S7 when the suction temperature T1 is within the motor usable range. However, when the suction temperature T1 exceeds the motor usable range, the air volume setting processing is finished while the air volume setting mode value is kept to the value G. Since the air volume setting mode value is kept to the value G, the automatic air volume setting can be automatically resumed when next test operation is performed. When the operation controller 61 goes to the processing of step S7, the operation controller 61 instructs the fan motor 55 to rotate at a predetermined instructed rotation number α [rpm] (step S7). This instructed rotation number α is set to a rotation number which is not less than a fan rotation number when the air blowing fan 50 is set to the maximum output, and it is set to a rotation number which is not less than the P1 upper limit rotation number the P10 upper limit rotation number described above. For example, it is set to an application limit rotation number of the fan motor 55. Subsequently, the operation controller 61 increases the fan rotation number r at a predetermined normal increasing speed (step S8), and determines whether the actual rotation number of the fan motor 55 (the fan rotation number r) is not less than the instructed rotation number (α [rpm]) (step S10) or the actual rotation number is stabilized at a rotation number different from the instructed rotation number (more specifically, whether the state that the difference between the instructed rotation number and the actual rotation number is not less than β [rpm] rpm continues for γ minutes or more (step S11) until a predetermined time-out time (8 minutes in this embodiment) T2 elapses (step S9). Whether the rotation number of the fan motor 55 is stabilized may be determined by the operation controller 61 or by the fan motor driving unit 63 (rotation number controller 63D).

When both the steps S10 and S11 provide negative determinations, the operation controller 61 returns to step S6. Accordingly, the processing of the steps S6 to S11 is repeated until an affirmative determination is obtained in any one of the steps S10 and S11.

When the affirmative result is obtained in any one of the steps S10 and S11, the operation controller 61 determines that the detection of the upper limit of the actual rotation number is completed, sets the actual rotation number at that time as the actual rotation number upper limit value r_MAX (step S13), and goes to step S14.

In step S14, the operation controller 61 refers to the determination table (FIG. 5), specifies the air volume setting mode value corresponding to the actual rotation number upper limit value r_MAX, and goes to step S21. The operation controller 61 sets the fan rotation number corresponding to the air volume setting mode value in step S21, and goes to the control of switching the fan rotation number according to this setting (fan rotation number switching control) under the normal operation of the built-in type air-conditioning device 1.

As described above, the fan rotation number which can keep the target air volume (Weak(L)/Strong(H)/Quick(HH)) can be set in conformity with the present external static pressure. The above processing is the air volume setting processing.

In this air volume setting, the operation controller 61 and the fan motor driving unit 63 function as an instructing part for instructing the rotation number of the air blowing fan 50, an air volume controller for controlling the air blowing fan 50 to a predetermined air volume, and a setting unit for performing the air volume setting processing.

As described above, in this embodiment, by setting the air volume setting mode value to the value G for instructing the automatic air volume setting (step S2: G), there is performed the air volume setting processing (S3 to S14) in which the actual rotation number when the output of the fan motor 55 is set to the maximum output (the actual rotation number upper limit value r_MAX) is measured and the fan rotation number corresponding to the target air volume of the air blowing fan 50 under the normal operation of the built-in type air-conditioning device 1 is set on the basis of the measured actual rotation number. Therefore, it is unnecessary to measure the air volume and the shaft power of the air blowing fan 50, and the fan setting for obtaining the proper air volume in conformity with the external static pressure can be easily and quickly performed.

Furthermore, in this construction, the rotation number of the fan motor 55 is detected on the basis of the pulse output from the motor 55, and the fan rotation number corresponding to the target air volume of the air blowing fan 50 is set on the basis of this rotation number. Therefore, it is unnecessary to provide a rotation detector as a separate body.

Furthermore, it is determined whether the rotation number of the air blowing fan 50 becomes stable or not (step S11), and the fan rotation number corresponding to the target air volume is set on the basis of the actual rotation number under a stable state. Therefore, the actual rotation number when the air blowing fan 50 is set to the maximum output can be precisely detected, and the proper fan rotation number can be set.

This embodiment has the determination table 62C which associates the actual rotation number with the air volume setting mode value corresponding to the external static pressure specified on the basis of the actual rotation number, specifies the air volume setting mode value corresponding to the actual rotation number by referring to the determination table 62C, and sets the fan rotation number corresponding to the target air volume on the basis of the specified air volume setting mode value. Therefore, this embodiment is adaptable to different machine types by changing any one of the determination table 62C and the air volume setting mode value. Accordingly, the degree of freedom of adapting various types of machines can be secured.

Furthermore, it is determined whether the air-conditioning device 1 is configured as a duct type or not, and the air volume setting processing is executed in case of the duct type. Therefore, there can be avoided such a situation that the air volume setting processing is also executed in other types except the duct type (for example, four-way ceiling cassette type) for which it is hardly necessary to consider the external static pressure.

Furthermore, in this embodiment, the air volume setting processing is executed when the built-in type air-conditioning device 1 is under test operation, and thus the fan setting can be completed when the test operation is performed.

<Manual Setting of Fan Rotation Number>

Next, the manual function will be described.

As shown in FIG. 7, when the air volume setting mode value is changed to a value other than the value G for instructing the automatic air volume setting (step S2: changed), the operation controller 61 sets the fan rotation number corresponding to the instructed air volume setting mode value (step S21). That is, the installation worker can set the air volume setting mode values (values 1 to 10) for the manual air volume setting in advance, and then manually set the fan rotation number by operating the test operation switch SW4 provided to the remote controller 66.

With respect to the thus-constructed built-in type air-conditioning device 1, the external static pressure varies in accordance with the installation state thereof or the like, and thus there occurs a risk that the fan rotation number of the manual air volume setting is excessively high under the environment of the present external static pressure.

Therefore, according to this embodiment, after the fan rotation number (set rotation number) corresponding to the target air volume (Weak (L)/Strong (H)/Quick (HH)) is changed, a check operation for the fan rotation number (fan check processing under setting change) is performed in an initial operation.

<Check of Manually Set Fan Rotation Number>

Figure 8:
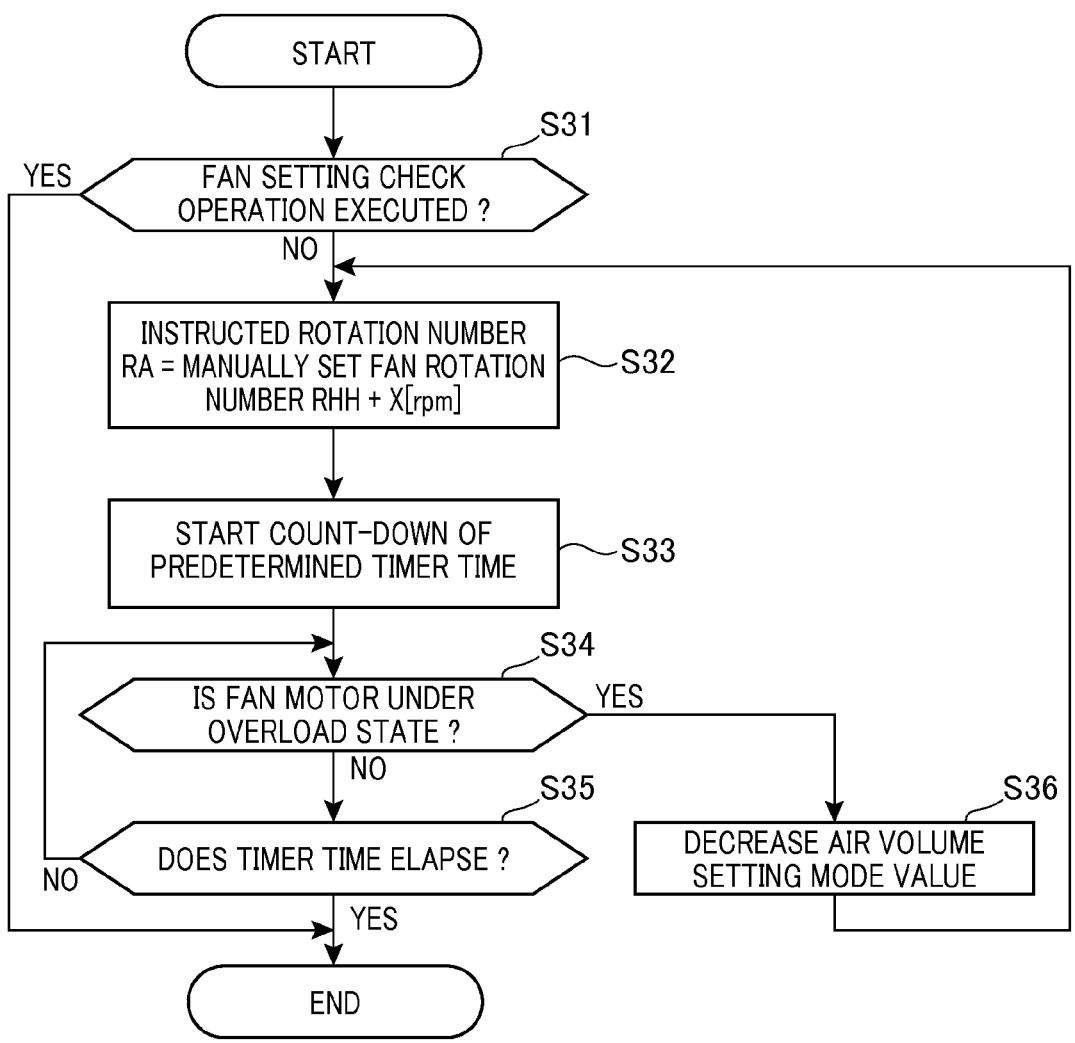
FIG. 8 is a flowchart showing a check operation for the fan rotation number which is manually set.

FIG. 8 is a flowchart showing the check operation of the manually set fan rotation number (the fan check processing under setting change). This flow is started by the operation controller 61 when the installation worker operates the power ON/OFF switch SW1 provided to the remote controller 66 after the manual setting and a normal operation (air blow operation/cooling operation/heating operation which is not a test operation) is performed.

In this case, the operation controller 61 determines whether the fan setting check operation is executed or not (step S31). When the fan setting check operation is not executed, the fan setting check operation is started. When the fan setting check operation has been executed, the operation concerned is finished without executing the fan setting check operation.

When the fan setting check operation is started, the operation controller 61 instructs the rotation at an instructing rotation number RA [rpm] which temporarily increases the rotation number of the fan motor 55 (step S32: check operation).

The instructing rotation number RA is a rotation number obtained by adding a predetermined additive rotation number X (for example, a fixed value within the range from several tens rpm to several hundreds rpm) to the maximum fan rotation number (the fan rotation number corresponding to "quick (HH)") which is manually set at present).

Subsequently, the operation controller 61 starts countdown of a predetermined timer time (corresponding to a check time) (step S33), and it is determined whether the fan motor 55 reaches an overload state within this timer time (step S34).

In this case, on the basis of whether a protection circuit provided to the air-conditioning device 1 works or not, the operation controller 61 determines whether the fan motor 55 falls into the overload state. More specifically, when it is detected by the current detector (first overcurrent protection circuit) 63A that the motor current reaches the current limit value LM (condition 1) or when it is detected by the phase detector (second overcurrent protection circuit) 63B that the phase of the PWM driving signal (motor driving signal) reaches the upper limit (condition 2), the operation controller 61 determines that the fan motor 55 reaches the overload state.

Here, when the fan motor 55 reaches the maximum output and the motor current reaches the current limit value LM in the check operation or when the phase of the PWM driving signal (motor driving signal) reaches the upper limit, the motor current is limited to the current limit value LM or less or limited to the upper limit or less. Therefore, the fan rotation number does not reach the instructed rotation number RA.

In place of the method of monitoring whether the protection circuit works, it may be monitored whether the rotation number of the air blowing fan 50 reaches the instructed rotation number RA. In this case, when the rotation number is still a rotation number (average actual rotation number) lower than the instructed rotation number RA, the protection circuit works, so that it is determined whether the fan motor 55 falls into the overload state.

Therefore, when the manually set fan rotation number is equal to a rotation number near to the fan motor maximum output (see FIG. 4) under the environment of the present external static pressure and thus it is not preferable to the normal operation, the fan motor 55 easily falls into the overload state (the state that the fan motor 55 reaches a protecting operation area) due to increase of the rotation number X. When the fan motor 55 reaches the overload state, it is known that the fan rotation number is erroneously set to a value which is excessively high under the present external static pressure.

This embodiment is configured so as to set the fan motor 55 to the overload state by selecting the additive rotation number X when the manually set fan rotation number is within a range Ar1 (a range hatched in FIG. 4) exceeding a recommended operation range.

When the fan motor 55 does not fall into the overload state although the operation at the instructed rotation number RA is continued (step S34: NO), it can be determined that the manually set fan rotation number is within the recommended operation range, so that the operation controller 61 waits for lapse of the timer time (step S35) and then finishes the processing concerned, that is, the fan setting check operation.

On the other hand, when the fan motor 55 falls into the overload state due to the operation at the instructed rotation number RA (step S34: YES), the operation controller 61 decreases the air volume setting mode value defining the present fan rotation number to a value which is lower by one step (step S36). For example, when the present air volume setting mode value is equal to the value 5, the value 5 is changed to the value 4. Accordingly, the manually set fan rotation number can be forcedly changed to a lower rotation number.

Thereafter, the operation controller 61 goes to the processing of step S32 again to rotate the fan motor 55 at the instructed rotation number RA obtained by adding the additive rotation number X (a value from several tens rpm to several hundreds rpm) to the maximum fan rotation number (the fan rotation number corresponding to "Quick (HH)") RHH which is set to a value lower by one step, and determines whether the fan motor 55 falls into the overload state. The additive rotation number X is set to a rotation number at which it can be determined that the manually set fan rotation number is not within the range Ar (FIG. 4) when the rotation number is increased up to the instructed rotation number.

When the fan motor 55 falls into the overload state, the operation controller 61 goes to step S36 to decrease the air volume setting mode value defining the present fan rotation number to a further one-step lower value. Therefore, the fan rotation number can be stepwise decreased until the fan motor 55 does not reach the overload state, so that the fan rotation number can be converged into the recommended operation range. The foregoing processing is the under-setting-change fan check processing to be executed when the fan rotation number (set rotation number) is changed.

In the under-setting-change fan check processing, the operation controller 61 and the fan motor driving unit 63 function as an under-change operation controller for performing the check operation and an under-change setting changing unite for decreasing the set rotation number as a result of the check operation.

As described above, when the fan rotation number is erroneously set, the fan rotation number can be corrected to a proper fan rotation number.

Here, as shown in FIG. 3, when the measurement temperature of a thermistor enters "overheat protecting operation area" which is not less than a temperature TK (black circle), deviation occurs from an actual line, and the error of the current limit value LM used for overcurrent protection becomes large. However, according to this construction, the check operation is performed in an initial operation after the fan rotation number (set rotation number) is changed, so that the check operation can be performed under the state that the measurement temperature does not enter the "overheat protecting operation area" (open circle) and thus the overcurrent detection can be precisely detected. The check operation may be performed in an initial operation under normal operation or the like.

According to this construction, the check operation for increasing the rotation number of the air blowing fan 50 from the set rotation number corresponding to the maximum air volume by only the predetermined rotation number (additive rotation number X) is executed after the set rotation number of the air blowing fan 50 is changed, and when the fan motor 55 falls into the overload state during the check operation, the set rotation number is forcedly decreased. Therefore, a proper countermeasure can be taken when the fan rotation number of the air blowing fan 50 is erroneously set.

In addition, when the set rotation number is forcedly decreased, the check operation of increasing the rotation number of the air blowing fan 50 from the set rotation number after the change by only the predetermined rotation number (additive rotation number X) is executed, and when the fan motor 55 falls into the overload state during the check operation, the set rotation number is further decreased. Therefore, a proper countermeasure can be taken when the fan rotation number is erroneously set.

When the motor current of the air blowing fan reaches the predetermined current limit value LM, it is determined that the fan motor 55 falls into the overload state. Therefore, whether the fan motor 55 falls into the overload state or not can be easily determined by using the current detector (first overcurrent protection circuit) 63A as an existing overcurrent protection circuit.

In addition, this construction is provided with the automatic function for automatically setting the set rotation number of the air blowing fan 50 and the manual function for manually setting the set rotation number of the air blowing fan 50, and when the set rotation number is changed by the manual setting, the foregoing check operation is executed, so that a proper countermeasure to erroneous setting which easily occurs under the manual setting operation can be taken.

<Monitoring of Air Blowing Fan Under Normal Operation>

According to the above check operation, the operation is estimated as an operation within the recommended operation range. However, a check operation of checking the air blowing fan 50 at a time interval irrespective of the air blowing speed under normal operation (fan check processing under normal operation) is performed in consideration of a factor missed by a worker or an unexpected situation such as a motor trouble or the like.

Figure 9:
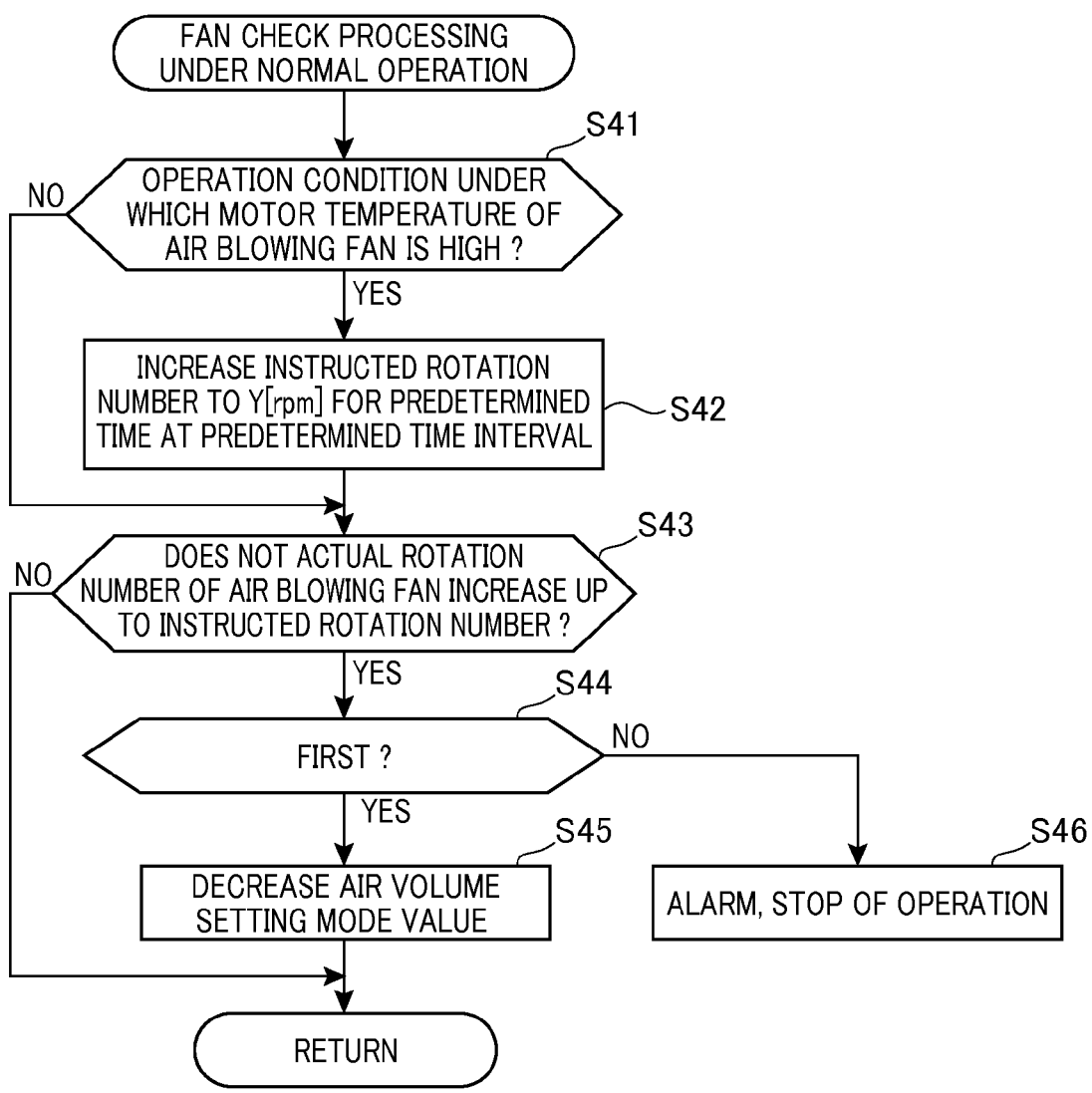
FIG. 9 is a flowchart showing fan check processing under normal operation.

FIG. 9 is a flowchart showing the fan check processing under normal operation. This processing is repetitively executed at a predetermined period under normal operation.

First, the operation controller 61 determines whether an operation condition under which the motor temperature of the air blowing fan 50 is estimated to be high is satisfied (step S41). Specifically, it is determined whether the suction temperature T1 detected by the suction temperature sensor 65 is not less than a predetermined temperature and an operation time in which the motor temperature increases sufficiently (one hour from the start of the normal operation in this embodiment) elapses. When the condition of the step S41 is satisfied, the operation controller 61 instructs an operation of temporarily increasing the rotation number of the fan motor 55 at a predetermined time interval (step S42: increasing operation).

The instructed rotation number RB under this increasing operation is set to a value obtained by adding the fan rotation number at the present time point with a predetermined additive rotation number Y (for example, a fixed value in the range from several rpm to several tens rpm) (step S42). The instructed rotation number RB is kept for only a predetermined time, and it is returned to the fan rotation number conformed with the present instructed air volume (the air volume of weak(L)/strong(H)/quick(HH)) when the time concerned elapses.

Subsequently, the operation controller 61 determines whether the actual rotation number of the air blowing fan 50 increases up to the instructed rotation number RB during the increasing operation (step S43). In this case, the operation controller 61 determines the average actual rotation number RC of the air blowing fan 50, and determines whether the average actual rotation number RC is decreased from the instructed rotation number RB by a predetermined rotation number Z or more. When the average actual rotation number RC is decreased by the predetermined rotation number Z or more (RB−RC>Z), it is determined that the rotation number of the air blowing fan 50 does not increase (step S43: YES).

When the rotation number of the air blowing fan 50 does not increase, this state corresponds to a state (primary protection) under which motor protection is applied by the current detector (first overcurrent protection circuit) 63A or the phase detector (second overcurrent protection circuit) 63B.

In this case, the operation controller 61 determines whether it is a first time or not that the rotation number of the air blowing fan 50 does not increase (step S44). In case of the first time (step S44: YES), the operation controller 61 determines whether the fan rotation number is within the range Ar1 (the range hatched in FIG. 4) exceeding the recommended operation range, and decreases the air volume setting mode value defining the present fan rotation number to a two-step lower value (the rotation number which is the same level as the additive rotation number X) (step S45: secondary protection). For example, when the present air volume setting mode value is equal to the value 5, it is changed to the value 3. Accordingly, the fan rotation number which is automatically or manually set in advance can be forcedly changed to a lower rotation number, and the fan rotation number corresponding to each air volume (an air volume of weak(L)/strong(H)/quick(HH)) can be decreased.

On the other hand, when it is not the first time (step S44: NO), the situation is an unexpected situation such as motor trouble or the like. Therefore, the operation controller 61 emits an alarm indicating the fact by an alarm device 67, and stops the operation of the built-in type air conditioner 1 (step S46). Accordingly, when the situation that the rotation number of the air blowing fan 50 does not increase is a second time, an alarm is emitted and the operation is forcedly stopped. The foregoing processing is the fan check processing under normal operation.

In the fan check processing under normal operation, the operation controller 61 and the fan motor driving unit 63 function as an under-normal-operation operation controller for performing the increasing operation of the air blowing fan 50 and an under-normal-operation setting changing unit for decreasing the set rotation number as a result of the check operation.

According to this construction, the increasing operation of increasing the rotation number of the air blowing fan 50 by only the predetermined rotation number (additive rotation number Y) at a time interval is performed during the operation of the air blowing fan 50, and when the rotation number of the air blowing fan 50 does not increase in spite of the increasing operation, the set rotation number of the air blowing fan 50 is decreased. Therefore, the fan motor 55 for driving the air blowing fan 50 can be properly protected in accordance with an unexpected situation.

In this case, when the motor current of the air blowing fan 50 reaches the predetermined current limit value, the fan motor 55 can be properly protected by efficiently using the protection circuits 63A and 63B for limiting the motor current to the current limit value or less.

Furthermore, when the rotation number of the air blowing fan 50 is not increased by even the increasing operation after the set rotation number is decreased, an alarm is emitted and the operation is stopped. Therefore, the air blowing fan 50 can be more properly protected. Any one of emission of an alarm and stop of the operation may be performed.

Furthermore, the increasing operation is executed when the predetermined condition under which the motor temperature of the air blowing fan 50 is estimated to be high is satisfied. Therefore, the fan motor 55 can be monitored on the basis of a severe condition, and thus a defect can be early detected. In this case, the predetermined condition resides in that the suction temperature T1 is equal to a predetermined temperature or more and the operation time in which the motor temperature increases sufficiently (one hour from the start of the normal operation in this embodiment) elapses. However, the present invention is not limited to this condition, and it may contain a condition that the air volume of the air blowing fan is not less than a predetermined air volume (for example, "quick (HH)"), and it may contain at least one of these conditions.

The above embodiment is an example of the present invention, and various alterations may be arbitrarily performed without departing from the subject matter of the present invention.

For example, in the above embodiment, the processing of the step S11 for determining whether the air blowing fan 50 is stable or not is executed in order to precisely measure the actual rotation number under the state that the fan motor 55 is set to the maximum output. However, the present invention is not limited to this style. For example, it is determined by the phase detector 63B of the fan motor driving unit 63 whether the phase of the PWM driving signal reaches the limit value corresponding to the upper limit of the motor current, and when it reaches the limit value, it can be also determined that the air blowing fan 50 rotates at the maximum output. Therefore, the processing of measuring the actual rotation number at that time may be executed. This processing may be executed in place of the step S11 or in addition to the step S11. According to this construction, the actual rotation number when the air blowing fan 50 is set to the maximum output can be precisely detected by using the existing phase detector 63B.

Figure 10:
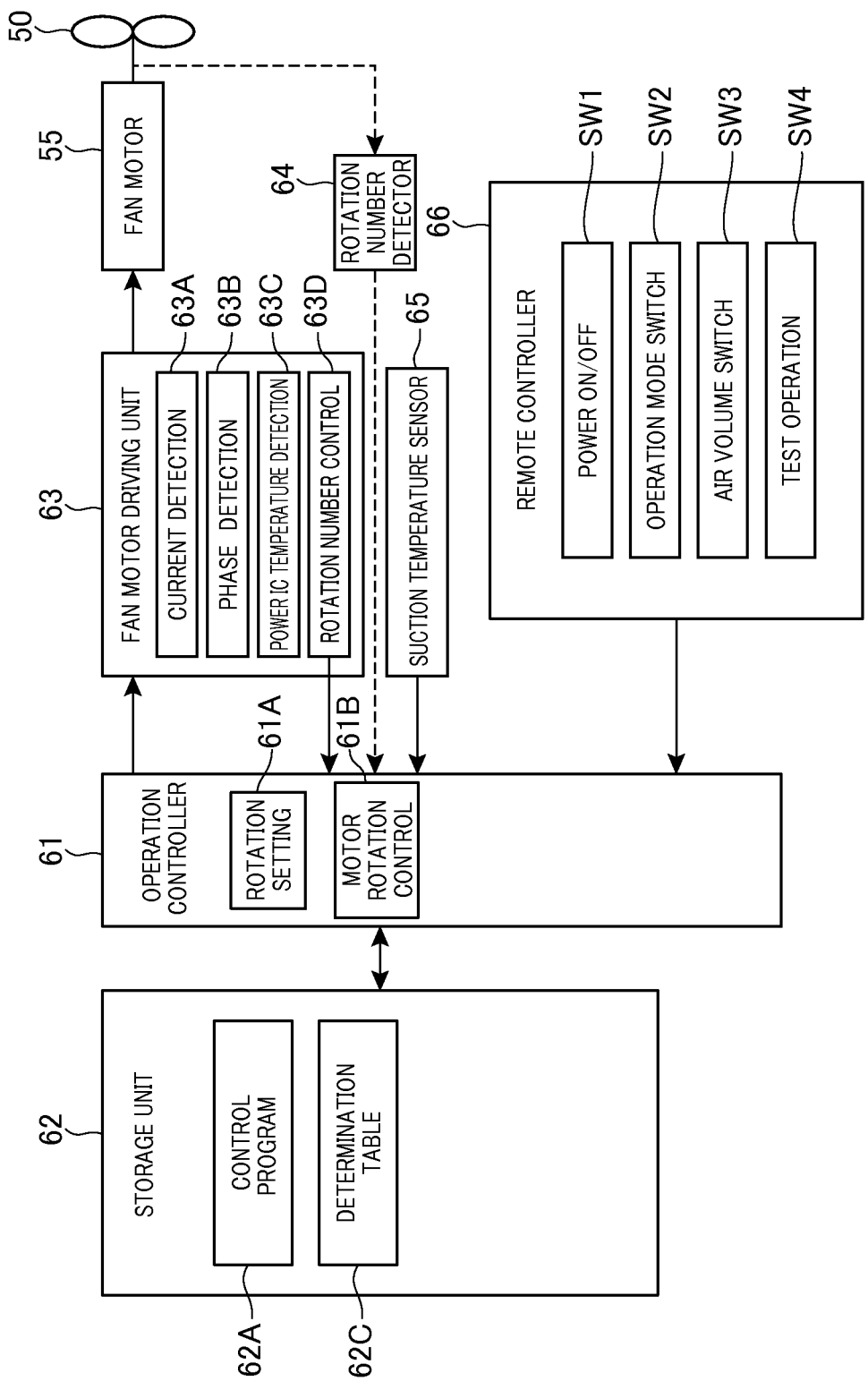
FIG. 10 is a diagram showing an air blowing fan control system according to a modification.

In the above embodiment, the rotation of the fan motor 55 is controlled by the pulse width modulation (PWM) system. However, the present invention is not limited to this style, and it may be controlled by the pulse amplitude modulation (PAM) system. In this case, as shown in FIG. 10, the fan motor driving unit 63 is provided with an amplitude detector (protection circuit) 63E for monitoring the amplitude of the PAM driving signal so that the amplitude of the PAM driving signal does not exceed the limit value corresponding to the upper limit of the motor current, and it is determined by the amplitude detector 63E whether the phase of the PAW driving signal reaches the limit value corresponding to the upper limit of the motor current. The actual rotation number when it reaches the limit value may be measured. According to this construction, the actual number when the air blowing fan 50 is set to the maximum output can be precisely detected. In FIG. 10, the alarm device 67 shown in FIG. 2 is omitted, but it may be provided.

Furthermore, in the above embodiment, the operation controller 61 and the fan motor driving unit 63 function as the instructing unit for instructing the rotation number of the air blowing fan 50, the air volume controller for controlling the air volume of the air blowing fan 50 to a predetermined air volume, the setting unit for executing the air volume setting processing, the under-change operation controller for executing the check operation when the set rotation number of the air blowing fan 50 is changed, the under-change setting changing unit for decreasing the set rotation number as a result of the check operation, the under-normal-operation operation controller for executing the increasing operation of the air blowing fan 50 under normal operation, and the under-normal-operation setting changing unit for decreasing the set rotation number as a result of the increasing operation. These units may be constructed by different hardware devices, and the construction of the control system may be arbitrarily changed.

Furthermore, in the above embodiment, as indicated by broken lines of FIGS. 2 and 10, the rotation number detector 64 for detecting the rotation number of the fan motor 55 (fan rotation number γ) may be provided so that the rotation number detected by the rotation number detector 64 is fed back to the motor rotation controller 61B of the operation controller 61. In this case, the operation controller 61 can execute the air volume setting processing (S3 to S14) for setting the fan rotation number corresponding to the target air volume on the basis of the fed-back rotation number (fan rotation number γ).

Still furthermore, in the above embodiment, the present invention is applied to the built-in type air-conditioning device 1, but the present invention is not limited to this style. The present invention may be broadly applied to an air-conditioning device having a duct, or properly applied to other types of air-conditioning devices.

Still furthermore, in the above embodiment, the control program 62A for executing the above processing is stored in the air-conditioning device 1. However, the control program 62A may be stored in a computer-readable recording medium such as a magnetic recording medium, an optical recording medium, a semiconductor recording medium or the like so that a computer reads out the control program 62A from the recording medium and executes the control program 62A. Furthermore, the control program 62A may be down-loaded from a delivery server or the like on a communication network through an electrical communication circuit.

DESCRIPTION OF REFERENCE NUMERALS 1 built-in type air-conditioning device
5 indoor unit
50 air blowing fan
53 suction duct
54 blow-out duct
55 fan motor
61 operation controller
62 storage unit
62A control program
62C determination table
63 fan motor driving unit
63A current detector (protection circuit)
63B phase detector (protection circuit)
63E amplitude detector (protection circuit)
64 rotation number detector
65 suction temperature sensor
66 remote controller
67 alarm device

The invention claimed is:

1. An air-conditioning device that is provided with an indoor unit having an air blowing fan accommodated therein and blows out air from the air blowing fan, comprising:
    an air volume controller that switches a rotation number of the air blowing fan under normal operation of the air-conditioning device so that the air blowing fan is controlled to a predetermined air volume;
    a setting unit that executes air volume setting processing for measuring an actual rotation number when a fan motor for driving the air blowing fan is set to a maximum output and setting the rotation number corresponding to the air volume on the basis of the measured actual rotation number;
    an under-change operation controller that executes a test operation for temporarily increasing the rotation number of the air blowing fan from the set rotation number by only a predetermined rotation number after the set rotation number of the air blowing fan is changed; and
    an under-change setting changing unit that decreases the rotation number of the air blowing fan to be lower than the set rotation number when the fan motor for driving the air blowing fan falls into an overload state in the test operation,
    wherein when the fan motor does not fall into the overload state, the under-change operation controller returns the rotation number of the air blowing fan to the set rotation number and finishes the test operation.

2. The air-conditioning device according to claim 1, wherein the setting unit detects the rotation number of the motor for driving the air blowing fan on the basis of a pulse output of the motor, and sets the rotation number corresponding to the air volume on the basis of the detected rotation number.

3. The air-conditioning device according to claim 1, wherein the motor for driving the air blowing fan is provided with a rotation number detection device, and the setting unit sets the rotation number corresponding to the air volume on the basis of a rotation number detected by the rotation number detection device.

4. The air-conditioning device according to claim 1, wherein the setting unit sets the rotation number corresponding to the air volume on the basis of an actual rotation number when driving power of the air blowing fan reaches a predetermined upper limit.

5. The air-conditioning device according to claim 4, wherein the air blowing fan is subjected to motor control by a pulse width modulation system or a pulse amplitude modulation system, and the setting unit sets the rotation number corresponding to the air volume on the basis of an actual rotation number when pulse width or pulse amplitude reaches a predetermined limit.

6. The air-conditioning device according to claim 1, wherein the setting unit executes the air volume setting processing when the air-conditioning device is under test operation.

7. The air-conditioning device according to claim 1, wherein the setting unit determines whether the air-conditioning device is configured as a duct type or not, and executes the air volume setting processing in case of the duct type.

8. The air-conditioning device according to claim 1, wherein when the under-change setting changing unit decreases the set rotation number, the under-change operation controller executes a test operation of increasing the rotation number of the air blowing fan from the set rotation number after the change by only a predetermined rotation number, and the under-change setting changing unit further decreases the set rotation number when the fan motor falls into an overload state in the test operation.

9. The air-conditioning device according to claim 1, wherein it is determined that the fan motor falls into the overload state when motor current of the air blowing fan reaches a predetermined current limit value.

10. The air-conditioning device according to claim 1, wherein an automatic function for automatically setting the set rotation number of the air blowing fan and a manual function for manually setting the set rotation number of the air blowing fan are provided, the test operation is executed when the set rotation number is changed by manual setting, and the set rotation number is decreased when the fan motor falls into an overload state in the test operation.

11. The air-conditioning device according to claim 1, further comprising an under-normal-operation operation controller that executes an increasing operation of increasing the rotation number of the air blowing fan from the set rotation number by only a predetermined rotation number at a time interval during operation of the air blowing fan, and an under-normal-operation setting changing unit that decreases the set rotation number when the rotation number of the air blowing fan does not increase in spite of the increasing operation.

12. The air-conditioning device according to claim 11, wherein when the rotation number of the air blowing fan does not increase in spite of the increasing operation after the under-normal-operation setting changing unit decreases the set rotation number, at least one of emission of an alarm and stop of the operation is performed.

13. The air-conditioning device according to claim 11, further comprising a protection circuit that limits the motor current of the air blowing fan to a predetermined current limit value or less when the motor current of the air blowing fan reaches the predetermined current limit value.

14. The air-conditioning device according to claim 1, wherein the fan motor is a DC brushless motor.

15. The air-conditioning device according to claim 1, wherein at least one of a blow-out duct and a suction duct is connected to the indoor unit.

16. A method of controlling an air-conditioning device having an indoor unit in which an air blowing fan is accommodated and to which at least one of a blow-out duct and a suction duct is connected, blow-out air being blown out by the air blowing fan, comprising:
   executing air flow setting processing of measuring an actual rotation number when a fan motor for driving the air blowing fan is set to a maximum output, and setting a rotation number corresponding to an air volume of the air blowing fan under normal operation of the air-conditioning device on the basis of the measured actual rotation number;
   executing a check operation of temporarily increasing the rotation number of the air blowing fan from set rotation number by only a predetermined rotation number after the set rotation number of the air blowing fan is changed; and
   decreasing the rotation number of the air blowing fan to be lower than the set rotation number when a fan motor for driving the air blowing fan falls into an overload state in the check operation,
   wherein when the fan motor does not fall into the overload state, returning the rotation number of the air blowing fan to the set rotation number and finishing the test operation.

17. The method of controlling the air-conditioning device according to claim 16, further comprising: executing a step of executing an increasing operation of increasing the rotation number of the air blowing fan from the set rotation number by only a predetermined rotation number at a time interval during operation of the air blowing fan, and a step of decreasing the set rotation number when the rotation number of the air blowing fan does not increase in spite of the increasing operation.

18. An air-conditioning device that is provided with an indoor unit having an air blowing fan accommodated therein and blows out air from the air blowing fan, the air blowing fan being driven by a fan motor, comprising:
   an air volume controller that switches a rotation number of the air blowing fan under normal operation of the air-conditioning device so that the air blowing fan is controlled to a predetermined air volume;
   a storage unit that stores a first relationship between an upper limit value of an actual rotation number of the fan motor corresponding to external static pressure and an air volume setting mode value defined to correspond to the upper limit value of the actual rotation number, and stores a second relationship between the air volume setting mode value and a fan rotation number at which a target air volume is generated and which is specified based on the upper limit value of the actual rotation number, the air volume setting mode values being provided in a plurality so as to stepwise increase as the fan rotation number increases;
   a setting unit that executes air volume setting processing for measuring the upper limit value of the actual rotation number when the fan motor is set to a maximum output, for determining the air volume setting mode value corresponding to the upper limit value of the actual rotation number based on the first relationship, for specifying the fan rotation number corresponding to the determined air volume setting mode value based on the second relationship and for automatically setting the rotation number of the air blowing fan to the specified fan rotation number;
   a switch receiving manual setting of one of the plurality of air volume setting mode values;

an under-change operation controller that executes a test operation for temporarily increasing the rotation number of the air blowing fan from the fan rotation number corresponding to the selected air volume setting mode value by the manual setting by only a predetermined rotation number; and an under-change setting changing unit that decreases the selected air volume setting mode value to decrease the rotation number of the air blowing fan to be lower than the fan rotation number corresponding to the selected air volume setting mode value when the fan motor for driving the air blowing fan falls into an overload state in the test operation, wherein when the fan motor does not fall into the overload state, the under-change operation controller returns the rotation number of the air blowing fan to the fan rotation number corresponding to the selected air volume setting mode value and finishes the test operation.

* * * * *